April 30, 1968 N. A. REDL 3,380,260
TUNNEL-BORING MACHINE
Filed Nov. 30, 1964 12 Sheets-Sheet 7

FIG. 7.

Inventor
Narcisse Albert Redl
By Cushman, Darby & Cushman
Attorneys

FIG_8_

FIG_9_

April 30, 1968 N. A. REDL 3,380,260
TUNNEL-BORING MACHINE
Filed Nov. 30, 1964 12 Sheets-Sheet 10

Inventor
Narciss Albert Redl
By Cushman, Darby & Cushman
Attorneys

April 30, 1968

N. A. REDL

3,380,260

TUNNEL-BORING MACHINE

Filed Nov. 30, 1964

Inventor
Narciss Albert Redl
By Cushman, Darby & Cushman
Attorneys

April 30, 1968  N. A. REDL  3,380,260
TUNNEL-BORING MACHINE

Filed Nov. 30, 1964  12 Sheets-Sheet 12

FIG. 16

Inventor
Narciss Albert Redl
By Cushman, Darby & Cushman
Attorney

United States Patent Office 3,380,260
Patented Apr. 30, 1968

3,380,260
TUNNEL-BORING MACHINE
Narciss Albert Redl, 405 Hilliard St.,
Saskatoon, Saskatchewan, Canada
Filed Nov. 30, 1964, Ser. No. 414,763
Claims priority, application Canada, July 31, 1964,
908,472
6 Claims. (Cl. 61—84)

This invention relates to tunnel boring or digging devices and in particular to a boring machine that incorporates means for forming a concrete lining for a tunnel concurrent with the excavation thereof.

Tunneling machines per se are well known in the art, various machines having been designed specifically for operation in different soil or rock conditions and for various types of tunneling work. For example, Canadian Patent No. 645,296 to Tinlin, of July 24, 1962, discloses a tunneling machine adapted for excavation work in rock. This particular device includes a head section provided with a plurality of air operated hammers to cut into a rock face by force of impact.

A further example of the prior art may be seen in the United States Patent to Mack, No. 1,338,237 of April 27, 1920. This specification illustrates a tunneling apparatus having an annular rotatable cutting head and a more centrally located shovel or scoop-like cutter in addition. The apparatus, in this instance, is propelled by means of driven caterpillar tracks or treads and includes means for placing a metal lining in the tunnel as the latter is excavated.

A more recent U.S. Patent, No. 3,075,591 to Pirrie et al., discloses a tunnel boring machine having rotatable radially disposed blades at the forward or digging end. Like the Mack patent, this specification shows means for placing sectional metal lining or prefabricated concrete lining in the tunnel walls as excavation takes place.

There are, however, numerous disadvantages in machines of the prior art. The placing of tunnel lining, for instance, is most desirable in silty soil conditions such as sand, gravel, soft clay or the like but the apparatus needed for such operations is complex and difficult to operate. This is evident to a certain degree when it is realized that little or no commercial success has been awarded to tunneling machines of the prior art. Moreover, known machines with their forward sections crowded by lining laying apparatus and such mechanism as caterpillar tracks etc., render them unsuitable for excavation work in most tunneling jobs where a tunnel of rather small diameter is required, for example, in the region of four to six feet in diameter.

The principal object of the present invention, therefor, is to provide a tunnel boring machine that is relatively small in size allowing it to be easily moved from one location to another. Moreover, the machine of the present invention can be utilized for excavating tunnels of 54" diameter or smaller. The machine includes mechanism for forming poured concrete tunnel lining or conduit as excavation progresses without the need for expensive and time-consuming safety lining. To this end the instant boring machine includes novel pumping means for delivery "zero-slump" or partially set concrete from a source thereof to the head end of the tunnel and also includes means for evenly distributing the concrete about the tunnel wall to form the lining therefor.

In order to adapt the machine of the present invention for tunneling operations in a variety of soil conditions, there is provided cutting mechanism which, besides progressively trimming the tunnel face in an annular or corkscrew pattern, is adapted to cut in a plurality of angular positions with respect to the longitudinal axis of the machine or the tunnel thereby to provide for directional change of the machine during excavation and to cut around large rocks or similar obstructions in the tunnel face.

According to one of its broadest aspects, the present invention relates to a tunnel boring machine comprising a frame; a work head for excavating a tunnel face and being operatively mounted on said frame adjacent one end thereof; a conveyor on said frame for transferring cuttings from said work head and tunnel face rearward of said machine; said work head including:

(a) Cutting means defining the radius of said tunnel;
(b) First drive means adapted to actuate said cutting means;
(c) A universal joint connecting said cutting means and said first drive means; and
(d) Second drive means adapted to rotate said cutting means and said universal joint so as to form the periphery of said tunnel;

means for providing angular movement to said work head with respect to the longitudinal axis of said machine; means for providing angular movement to said universal joint with respect to said work head and said first and second drive means whereby the cutting means may undercut obstructions in the face of said tunnel; and means for progressively moving said machine along a defined path of excavation.

According to a further broad aspect, the present invention relatees to a tunnel boring machine comprising a frame; a work head operatively mounted on said frame for excavation of a tunnel face; a conveyor on said frame for transferring cuttings from said work head and tunnel face rearward of said machine; a tunnel lining assembly mounted on said frame and adapted to form a conduit in said tunnel from concrete poured in situ during said excavation; means on said machine for delivering said concrete from a source thereof to said lining assembly; vibratory means in said assembly adapted to act on said concrete delivered thereto; and means in said lining assembly for progressively moving said machine along a defined path of excavation.

The invention is illustrated, by way of example, in the accompanying drawings in which.

Figure 1:
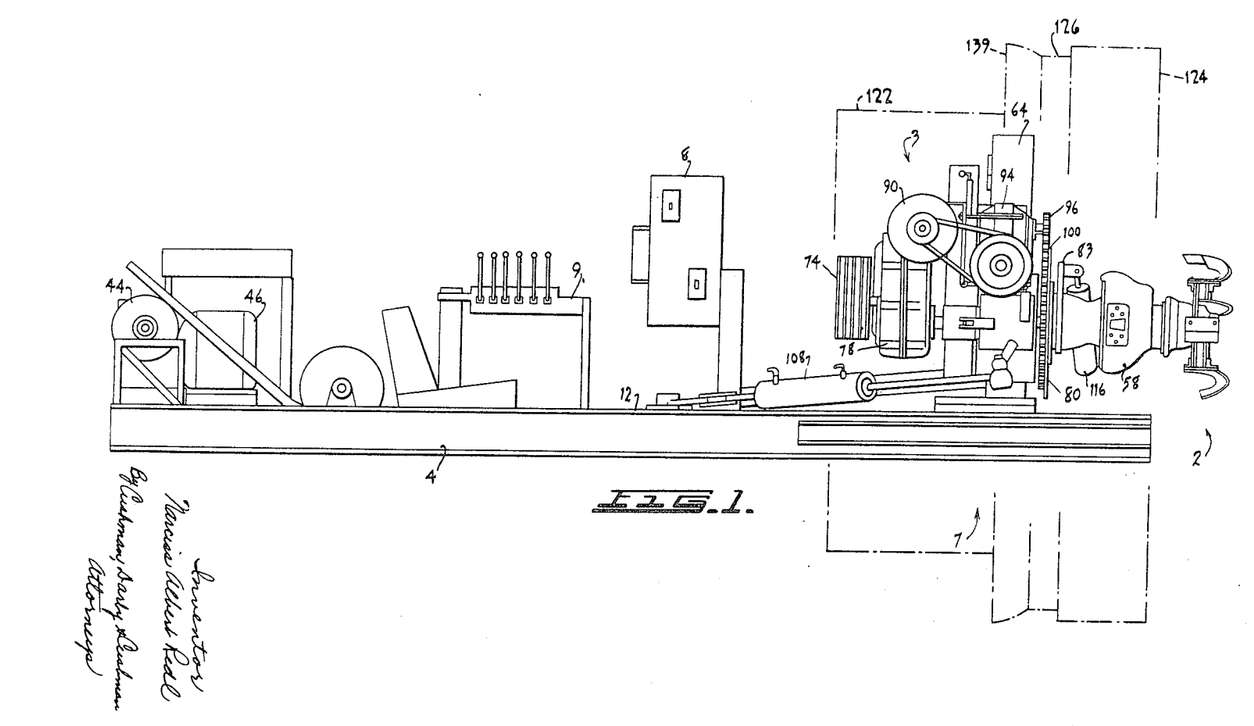
FIG. 1 is a side elevation view of the present invention showing mechanism in phantom for forming the lining or conduit of a tunnel.
Figure 2:
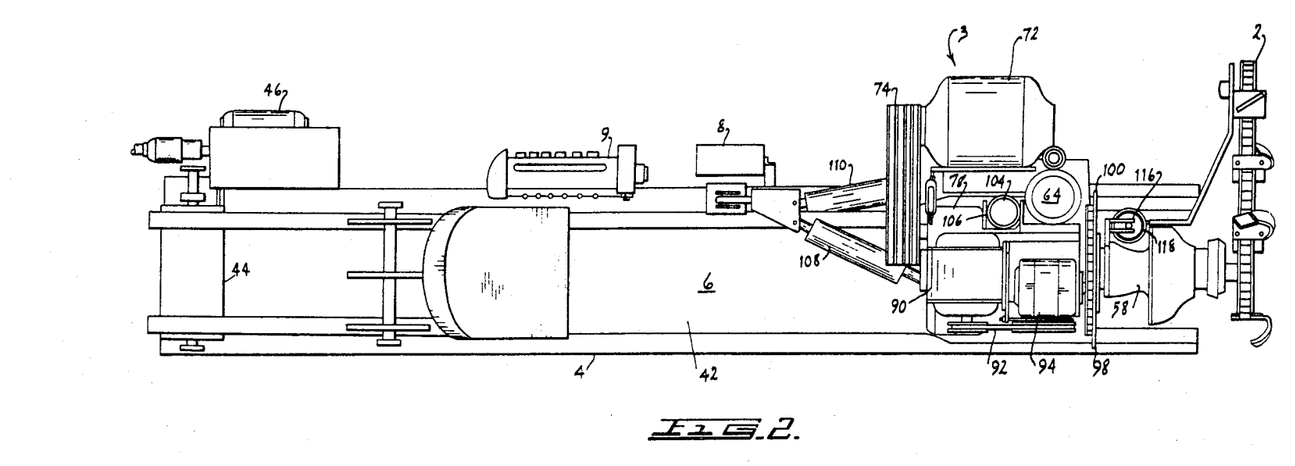
FIG. 2 is a plan view of the apparatus shown in FIG. 1.

As shown in FIGS. 1 and 2, the boring machine indicated generally at 1 includes a work head including cutting means 2 and its associated drive mechanism 3 which are mounted on an I-beam frame 4; walking beams 5 (FIG. 3); conveyor means 6; and a concrete lining forming head 7. Operational control of the boring machine 1 is carried out by means of an electric switch box 8 and an hydraulic control bank 9, the machine 1 being supplied with electrical power from a remote source (not shown).

FRAME AND WALKING BEAM

Figure 3:
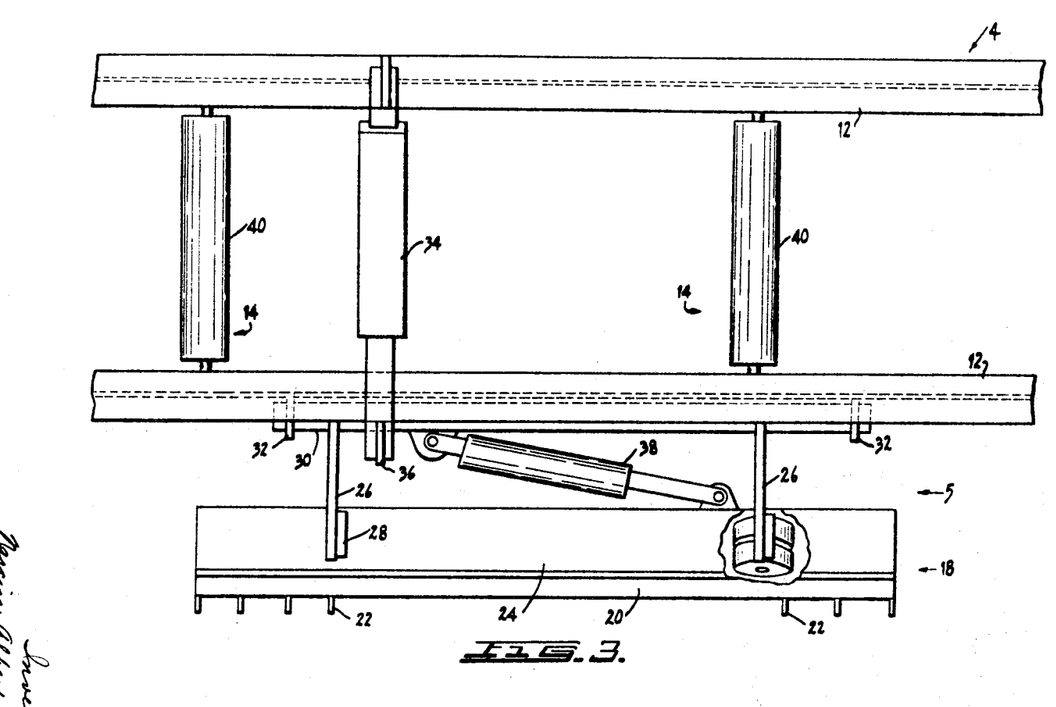
FIG. 3 is a plan view of the walking beam structure used in conjunction with the boring machine in earth work.
Figure 4:
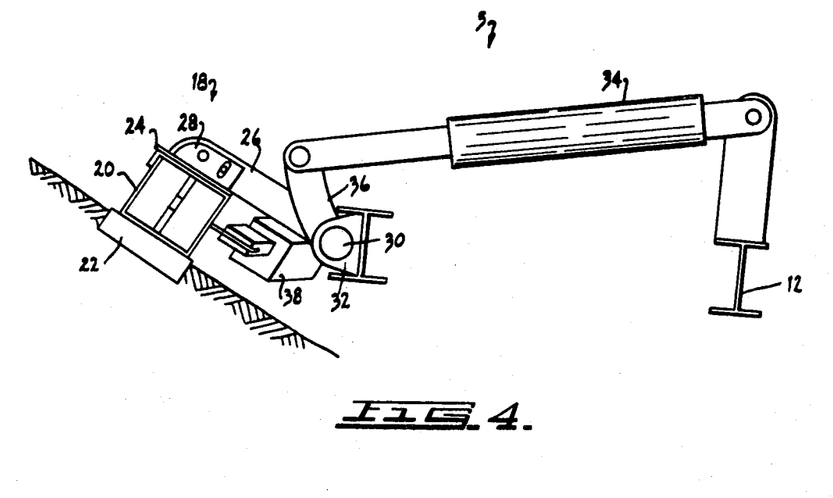
FIG. 4 is a sectional view of the apparatus shown in FIG. 3.
Figure 5:
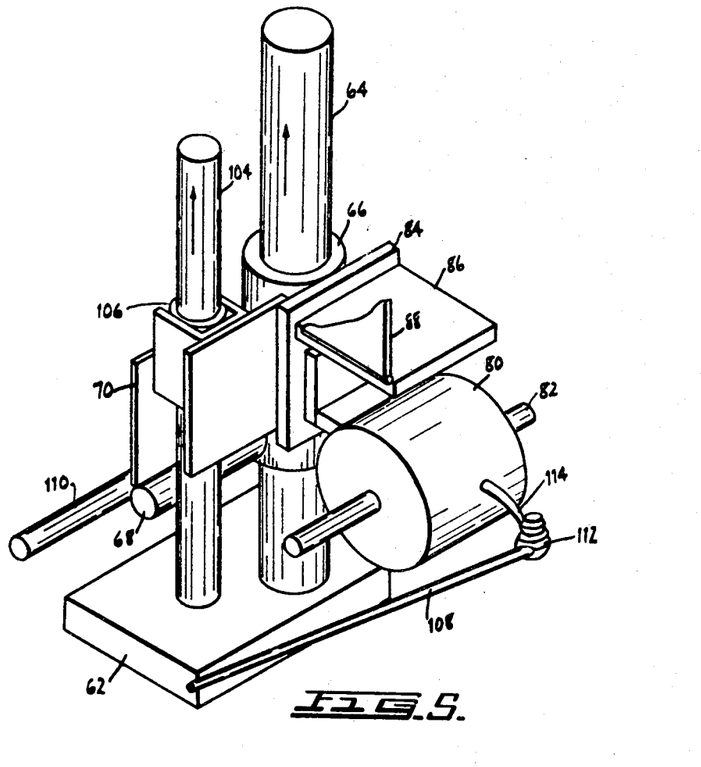
FIG. 5 is a perspective view in elevation of the means for pivotally mounting the drive and cutting mechanism of the present invention.

Referring now to FIGS. 3 and 5, the boring machine includes a main frame 4 which comprises a pair of spaced parallel I-beams 12 having a plurality of cross members 14. The machine is initially progressively moved forward or backward in the earth section of a tunnel along a defined path of excavation by means of "walking" beams 5, one on either side of the frame 4. For the purpose of illustration only one walking beam is shown and it comprises a tunnel wall gripping assembly generally indicated at 18 which includes a box beam 20 having a wall engaging surface consisting of a plurality of gripping cleats 22 spaced along its lower face. The box beam 20 is provided with a cover 24 having a pair of arms 26 extending therefrom to operatively connect the assembly to the frame 4. Each arm 26 is provided with an angle adjusting block 28 and is secured at its other end to a column 30 pivotally secured to the machine frame by means of brackets 32.

In order to bring the gripping assembly 18 into or out of engagement with the tunnel wall, an hydraulic cylinder or jacking member 34 is pivotally secured at one end to the frame 4 and at its other end to one end of a swingable arm 36 secured, in turn, to the column 30 whereby, depending upon the direction of action of the cylinder 34, the box beam 20 may be lifted away from or pressed into engagement with the tunnel wall.

The machine is advanced, relative to the walking beam 5, by power means such as a hydraulic cylinder 38 connected at one end to the frame and at the other end to the box beam 20 so that when cylinder 38 is actuated, the frame 4 and machine 1 are waved along the excavation path relative to the gripping assembly 18.

The frame 4 serves to carry conveyor means 6 adapted to remove cuttings from the tunnel face to the rear of the machine where such cutting may be moved entirely from the tunnel by tracked carts or the like. The frame cross members 14 are in the form of rollers 40 spaced throughout the length of the frame 4. An endless conveyor belt 42 is circulated about rollers 40 and a driving roller 44 disposed at the rear of the machine 1 and which is driven by a suitable electric motor 46. A pair of belt guides 48 (FIG. 7) secured to the frame beams 12 bear lightly on the belt 42 and serve to direct the cuttings to the center thereof.

WORK HEAD

Figure 6:
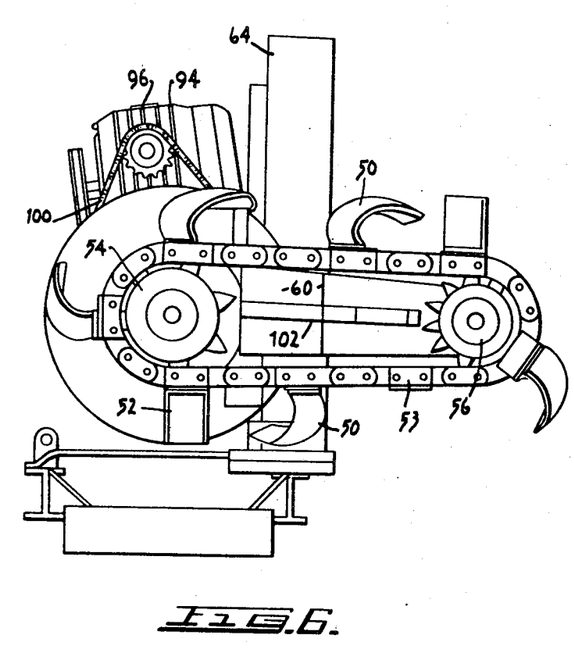
FIG. 6 is an end elevation of the apparatus shown in FIG. 1.
Figure 7:
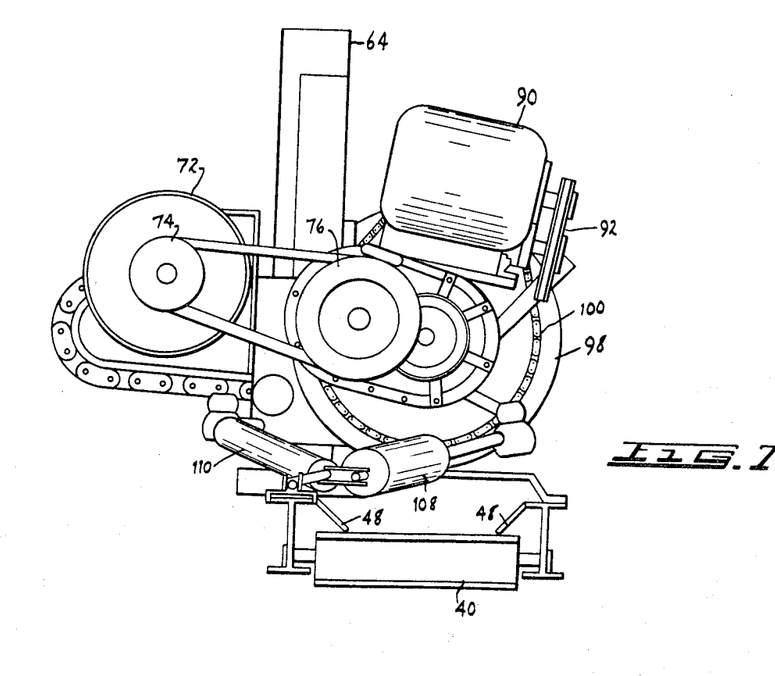
FIG. 7 is a sectional view of the apparatus taken along the lines 7—7 of FIG. 2.

The cutting head 2 and its associated drive mechanism 3 of the machine work head are shown in FIGS. 5, 6 and 7 and are mounted on the forward end of the frame 4 in a manner providing a maximum number of angular cutting positions with respect to the longitudinal axis of the machine 1. The cutting is effected by a plurality of cutting blades 50 and scraping or shovelling blades 52 secured to a roller chain 53 mounted on a centrally located drive sprocket 54 and idler sprocket 56. The drive sprocket 54 is mounted on a main shaft 82 driven through a universal knuckle or joint 58 (FIG. 1) and the latter is provided with a radially extending arm 60 onto which is rotatably mounted the idle sprocket 56. Arm 60, it will be noted, together with the cutting chain 53, defines the radius of the tunnel excavation.

As shown in FIGS. 1, 2 and 5, the abovementioned cutting head 2 and its drive mechanism 3 is carried by the forward end of the frame 4 through the intermediary of a base plate 62, welded to the I-beams 12, and having secured thereto a vertical main column 64 onto which a pivotal sleeve 66 is slidably mounted. The latter is provided with a base member 68 and plate 70 which serves to support first drive means comprising an electric motor 72 which drives the centrally positioned sprocket 54 through universal joint 58 and sheaves 74, 76; reduction housing 78; bearing box 80 and main drive shaft 82. The above-described drive mechanism serves to circulate the chain 53 about the sprockets 54 and 56. Sprocket 54 is, at all times, positioned centrally of the tunnel excavation direction whilst idle sprocket 56, on the radial arm 60, is adapted to rotate 360° about the sprocket 54 to allow the cutting blades 50 to carve the periphery of the tunnel in a manner to be described.

In addition to the support plate 70 for carrying the motor 72, the pivotal sleeve 66 on the column 64 is provided with a mounting plate 84 welded to the sleeve 66. A plate 86 is hingeably connected to the plate 84 and a further plate 88 is similarly connected to plate 86. The latter serves to support second drive means consisting of a motor 90 (see FIGS. 1 and 2) connected by a belt drive 92 to a worm gear reducer 94 secured to plate 86. Reducer 94 drives a sprocket 96 which is interconnected with a second sprocket 98 on the universal joint 58 by means of a chain 100. It will be appreciated, therefore, that as motor 72 rotates sprockets 54 and 56 to circulate the cutter chain 53, motor 90, by means of sprockets 96 and 98 and chain 100, rotates universal joint 58 to cause rotation of the associated radial arm 60 and idler sprocket 56 about the center of the drive sprocket 54.

As the machine 1 advances, this "corkscrew" movement of the radial arm 60 bores into the earth to form a tunnel concentric with the center of the drive sprocket 54 and the main drive shaft 82. The cuttings are directed onto the conveyor belt 42 by means of the scraping and shovelling blades 52 as well as by means of a central, longitudinal baffle plate 102 secured to the radial arm 60 and extending between the sprockets 54 and 56. The baffle plate 102 provides a quite efficient shovelling action to the earth that is removed from the tunnel face in directing the earth from the region of the cutting arm into the centrally positioned conveyor belt 42.

One of the main problems in tunnel excavation operations is encountering large stones or rock outcrop in the excavation path. The present invention includes steering means for the work head and its associated integers whereby the cutting chain 53 can be angularly disposed, in a plurality of positions, relative to the tunnel face so as to cut alongside of or partially around the abovementioned obstructions.

The work head is swingably and slidably mounted on the column 64 whereby a plurality of movements of the cutting head 2 is provided. Referring to FIGS. 1, 2 and 5, first jacking means in the form of a hydraulic cylinder 104 is secured at one end to the main base plate 62 and is positioned thereon adjacent the supporting column 64. A swivel collar 106 is pivotally secured to the cylinder 104 and rigidly connected to mounting plate 84 that is slidable in relation to the column 64 through the intermediary of the sleeve 66. Actuation of the cylinder 104 therefore provides a vertical adjustment to the cutting head 2 and drive means 3 upwardly and downwardly on the column 64.

For swinging the cutting head 2 in a horizontal plane, i.e., left to right, there is provided a second jacking means comprising a pair of hydraulic cylinders 108 and 110 both of which are secured at one end to a frame beam 12. Cylinder 108 is connected at its other end to the bearing box or casing 80 by means of a swivel joint 112 and arm 114 (FIG. 5). Cylinder 110 is pivotally connected at its other end to the sleeve 66 on the column 64. It will be seen that retraction of cylinder 110 effects a swinging movement in one direction to the cutter head 2 and drive means 3 on the sleeve 66 whilst a swing in the opposite direction is effected by retraction of cylinder 108.

It will be appreciated that the vertical and horizontal movement of the cutting head 2 and drive mechanism 3 provides a steering action to the boring machine 1 when a change in direction or elevation is called for.

The universal joint 58 and its associated radial arm 60 are adapted to assume a plurality of angular positions relative to the remaining integers of the work head and to the main drive shaft 82 (FIG. 5) as well as to the transverse axis of the tunnel. The arm 60, together with the cutting chain 53 and sprockets 54 and 56 are swivelled or steered on the universal joint 58 by means of a hydraulic cylinder 116 as shown in FIG. 1. One end of the latter is pivotally secured to the housing 83 of the main shaft 82 whilst the body of the cylinder 116 is pivotally connected to the universal joint 58 by means of a collar 118 (FIG. 2) mounted on the inner end of the radial arm 60. Actuation of cylinder 116 provides angular movement therefor to the cutting chain 53 allowing the latter to circulate angularly with respect to the longitudinal axis of the machine 1 whereby the chain 53 may cut into the face of the tunnel at a relatively sharp angle for excavating around large stones or the like. This angular operation of the cutting chain 53, radial arm 60 and universal joint 58 will be clearly evident by referring to FIGS. 8 and 9 of the accompanying drawings.

When travelling on its normal path of excavation, the machine 1 and its associated work head assumes the position substantially as shown in FIG. 2. In this normal operation, the electric motor 72 of the first drive means circulates the cutting chain 53 about the sprockets 54, 56 on the radial arm 60. Concurrently, motor 90 of the second drive means, by way of sprockets 96, 98 and chain 100, rotates the universal joint 58 and arm 60 about the mainshaft 82. One 360° revolution of arm 60 is completed about every two minutes. However, the revolutionary speed of arm 60 depends largely on the particular density of the earth in which the machine operates.

Now if an obstruction is encountered in the face of the tunnel, such as a large stone S shown in FIG. 8, the motor 90 of the second drive means is stopped, and the work head is subsequently swung to the most advantageous position by means of the hydraulic cylinders 108 and 110. Cylinder 116 is then actuated so as to swing the universal joint 58 and arm 60 at an angle with respect to the mainshaft 82 whereby the cutting chain 53 may be worked more directly into the face of the tunnel so as to cut around the stone S. It will be appreciated that although motor 90 is, at this stage, stopped, motor 72 is operated as normal to rotate chain 53.

Figure 8:
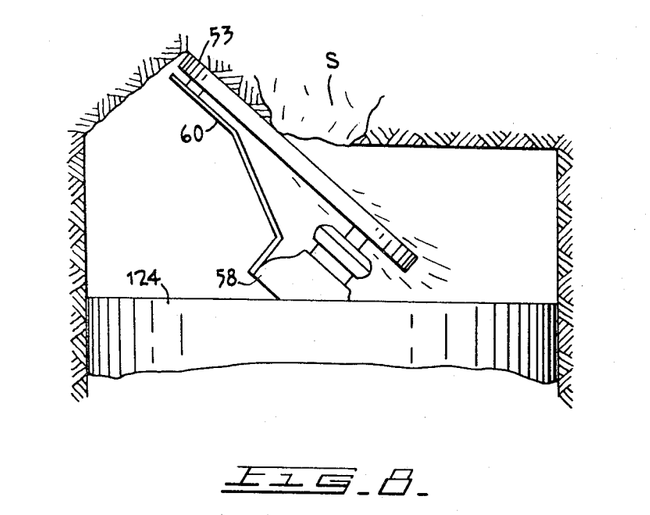
FIGS. 8 and 9 are sectional views of a tunnel showing how the cutting means of the present invention may undercut obstructions in the tunnel face.
Figure 9:
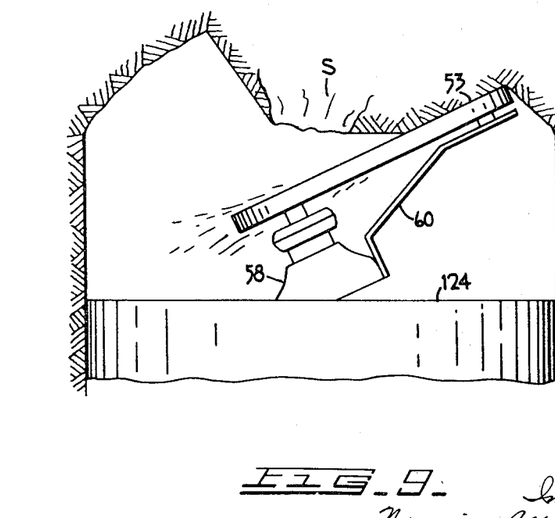

Subsequent to cutting away the earth from one side of the stone S as shown in FIG. 8, motor 90 is started so as to rotate the arm 60 to the other side of the obstruction where cutting will take place or shown in FIG. 9 after the universal joint 58 and arm 60 have been re-positioned by the hydraulic cylinder 116.

FIGURES 8 and 9 show only two positions of the cutting means in operation but it will be understood that other cutting positions, such as above and below the obstruction, would probably be necessary before a large obstruction could be cut away. After cutting takes place, the stone S would drop downward onto the conveyor means 6 for transportation to the rear of the machine 1.

CONCRETE FORMING ASSEMBLY

When tunnel excavation is carried out in solid rock there is, of course, no need for a lining. However, such is not the case in earth. Although the prior art shows several proposals for placing a lining in a tunnel as it is excavated, such proposals utilize prefabricated lining sections that must be placed and braced against the tunnel wall a substantial distance behind the digging apparatus of the machine in question. Now if the nature of the earth is very unstable, such as sand, loose gravel or the like, dangerous caving may occur between the time that the excavation takes place and the lining section is installed. The present invention, however, includes means whereby concrete may be poured or pumped in situ into a movable form that advances with the machine whereby no void is left into which earth may fall.

Figure 10:
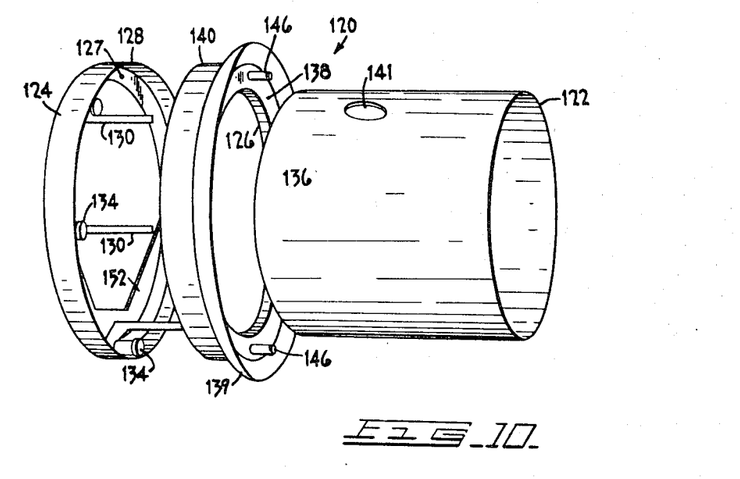
FIG. 10 appears on the same sheet as FIGS. 13 and 14 and is a perspective view, partially exploded, of the concrete forming apparatus adapted for connection to the apparatus shown in FIGS. 1 and 2.
Figure 11:
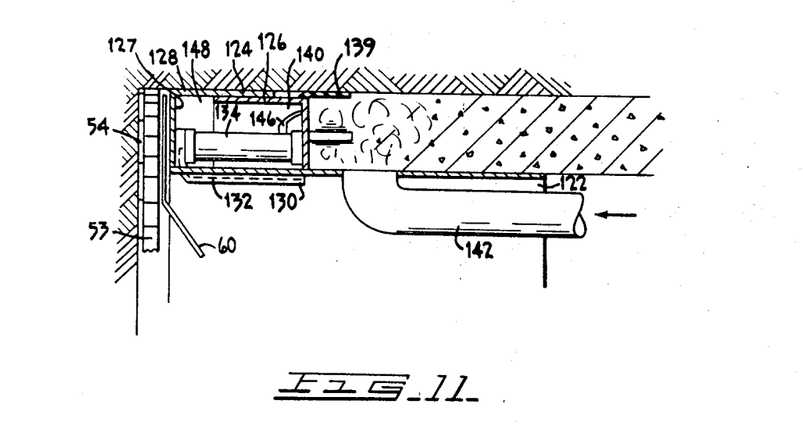
FIGS. 11 and 12 are segmental views of the apparatus shown in FIG. 10 and the manner by which it operates.
Figure 12:
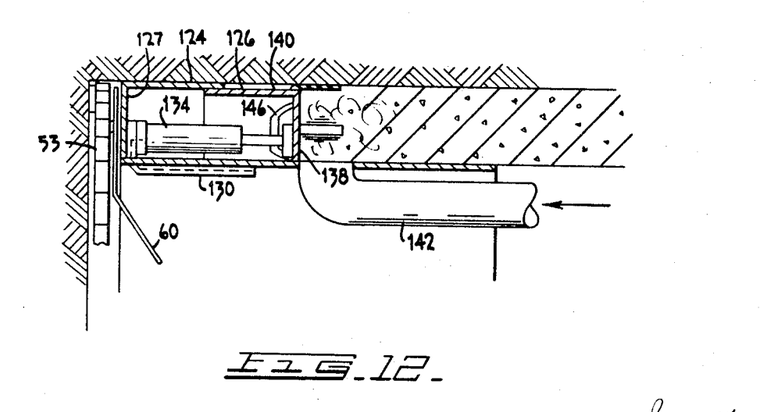

As shown in FIG. 10 a concrete forming or tunnel lining assembly generally indicated at 120 includes a steel forming sleeve 122; a first annular collar or ring 124; and a second collar 126. Referring to FIGS. 1, 11 and 12 it will be seen that the forming sleeve 122 is detachably secured to the frame beams 12 of the machine 1 and the leading edge of the sleeve 122 is disposed behind the cutting chain 53 and sprockets 54 and 56 of the work head. Collar ring 124 is substantially L-shaped in cross section and comprises an annular radial surface or flange portion 127 and a terminal wall engaging flange portion 128 normal thereto and concentric with the sleeve 122. As shown, the flange 127 is normal to the sleeve 122 and its inner diameter is equal to or slightly greater than the outer diameter of the sleeve 122 so as to slidably fit over the edge thereof. Wall engaging portion 128 is of a diameter substantially that, or slightly smaller than the cutting arc of the chain 53.

Collar 124 is secured to the forward end of sleeve 122 by a plurality of guide members 130 secured to the flange 127 and which include drilled passageways 132 for delivery of hydraulic fluid or air to a plurality of hydraulic jacks or cylinders 134. The sleeve 122 is provided with a number of notches 136 in the forward edge thereof (FIG. 10), each notch receiving a portion of a guide member 130 when the collar 124 is attached.

The second collar 126, like 124, is of L-shaped cross section and is mounted and slidable along the outer wall of the sleeve 122. Collar 126 comprises a radially disposed surface or flange portion 138 and an axially extending peripheral flange or ring 140 having a diameter slightly less than the corresponding ring on collar 124 so that it is slidable within the latter as shown in FIGS. 11 and 12. In addition, a rubber collar 139 is provided on the rear edge of the ring 140 so as to direct any small earth cuttings ahead of the collar 126, keeping such cuttings from being embedded in the concrete lining. Flange 128 of collar 126 provides a bracing wall for the hydraulic cylinders 134 for a purpose presently to be described.

Sleeve 122 is provided with at least one aperture 141 in the wall thereof and into which is placed, on the inside of the sleeve, one end of a delivery conduit 142, the other end thereof being connected to a concrete pump 144. It will be seen from FIG. 11 that the outer periphery of the sleeve 122 constitutes the inner form for the concrete lining whilst the outer form is provided by the tunnel wall.

Now the radial flange 138 is provided with a plurality of circumferentially spaced vibrators 146 having their coil portions secured to the side of the flange facing collar 124 wherein a void 148 exists, earth being kept from the void by the overlapped portions 128 and 140 of the collars. The vibratory armature shafts 150 extend through the flange 138 so as to act on the concrete pumped therearound from the aperture 141.

Referring to FIGS. 11 and 12 it will be seen that, as concrete is forced through the conduit 142, it is acted upon by the vibrators 146 so as to be evenly distributed between the inner form 122 and the tunnel wall. As the pressure of the concrete is approximately 2000 lbs./sq. in., collar 126 is forced forwardly so that its flange portion 138 contacts one end of the hydraulic jacks 134 closing the pistons thereof. The latter are then actuated, as shown in FIG. 12. The piston ends of the jacks, using the radial surfaces 127 and 133, and the concrete behind the latter as a brace, thereby force collar 124 forwardly drawing with it the sleeve 122 and the machine 1 relative to the collar 128 whereby chain 53 advances into the tunnel face. Further delivery of concrete then forces collar 126 forwardly again to close the jacks 134 and to provide space for further delivery of concrete. It will be appreciated that the walking beams 5 are used only during initial operations of the machine 1 when the latter begins cutting and before concrete is poured. After the concrete lining is instituted, the machine progresses by the pressure of the concrete delivered to the front of the machine wherein the jacks 134 utilize the concrete and the collar 126 to pull the machine 1 further into the tunnel face.

The forward facing collar 124, as shown in FIG. 10, may be provided with a face plate 152 to assist in directing earth cuttings to the centrally disposed conveyor belt 42. As shown in FIG. 1, the universal joint 58, cutting chain 53 and arm 60 are the only integers of the work head to extend outwardly of the lining assembly.

CONCRETE VIBRATORS

As described above, the radial flange of collar 126 carries a plurality of circumferentially spaced vibrators 146 wherein concrete may be distributed evenly about the form sleeve 122.

Figures 13, 14:
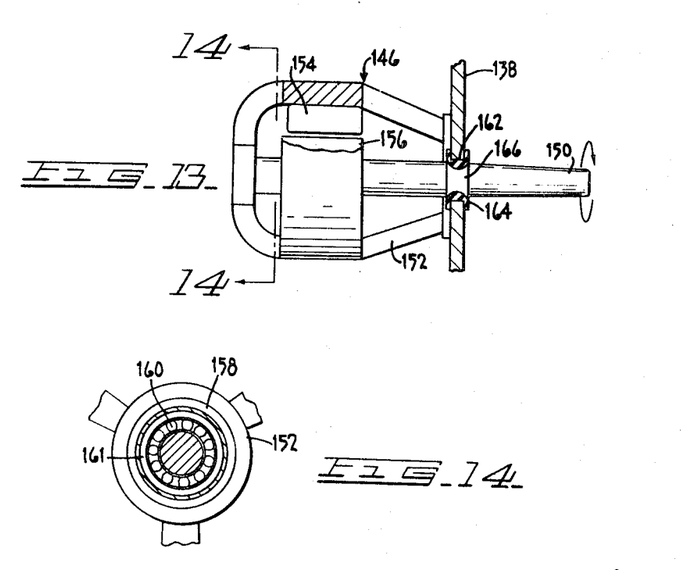
FIG. 13 is a side elevation view, partly sectioned, of the vibrators used with the apparatus shown in FIG. 10.
FIG. 14 is a sectional view taken along the lines 14—14 of FIG. 13.

Referring now to FIGS. 13 and 14, it is shown that each vibrator 146 comprises a housing 152 enclosing field coils 154 and adapted to effect a cranking motion to an armature shaft 156 coaxially mounted in the housing 152. One end of the latter is mounted freely in the housing 152 by means of an O-ring 158 and a ball race or similar bearing 160 circumferentially spaced from the periphery of the armature 156 by a void 161. The other end of the armature 156 extends outwardly beyond the housing 152 in the form of a shaft 150 that protrudes through an aperture 162 in a member such as the flange 138 of collar 128 when the housing 152 is secured thereto. The aperture 162 provides a seat for a grommet or collar 164 adapted to prevent rotation of the shaft 150 by way of a peripheral groove 166 in the latter into which the inner annular surface of the grommet is disposed. The outer annular surface of the grommet 164, formed preferably of resilient material, is grooved so as to peripherally engage the flange 138 as shown.

It will be appreciated that when current is applied to the coils 154, the armature 156 and its associated shaft 159 cannot rotate in the normal manner due to the gripping action of the grommet 164. Therefore, the end of the shaft 150 that is loosely seated by the bearing 160 is subjected to a cranking action in the void 161 thereby to rotate the end of the shaft 150 about its longitudinal axis. This end rotation is transmitted to the outer end of the shaft, which is held centrally by grommet 164, where the crank action is duplicated. The circular path of the shaft's outer end is shown by arrow A in FIG. 14. This, in effect, provides a vibratory action to concrete surrounding the shaft 150 and in order that it will not be gripped strongly by fast setting concrete the shaft 150 is tapered towards its outer terminal end as shown. This also helps to release the shaft 150 from the concrete as collar 126 and its associated radial flange 138 is forced forward by the pressure of the concrete.

CONCRETE PUMP

When tunneling in loose soil such as sand, gravel, soft clay and the like it is almost necessary, especially in tunnels of small diameter, to provide some means of immediately placing or forming a tunnel lining behind the cutting medium because the condition of the soil does not allow for the advancement of the tunnel machine into the soil and a subsequent placing of a lining in an embraced gap because the tunnel wall, between the cutting head of the tunneling machine and the lining, will almost certainly cave in due to its unstable condition.

It is an object of the present invention that concrete may be poured in situ with the excavation of the tunnel. Moreover, in order to dispense with safety linings that normally would have to be placed in the tunnel until such time as the concrete sets, it is proposed that extremely quick setting cencrete be used under high pressure. Tests of the instant tunnel digging machine having shown that the use of concrete of a zero-slump nature has been most successful in that, by the time the forming sleeve 122 has traversed a path equal to its own length, the concrete has been set to a sufficient degree that safety lining need not be used.

The term zero-slump is the result of what is known as slump tests wherein a specific volume of concrete is dumped or dropped onto a flat surface from a given height. The concrete with a high moisture content or a loose mix will slump to a substantial degree, say from 5 to 6 inches. However, as the concrete reaches its setting stage or if the mix is dry the slump factor is substantially reduced. The concrete used in testing the machine of the instant invention had a zero to one inch slump factor.

The problem arises, however, as the manner by which such dry and quick-setting concrete can successfully be pumped around the form sleeve 122. Accordingly, the present invention incorporates a novel concrete pump which, as may be seen from FIG. 15 comprises a hopper 167 that is secured to a frame beam 12 and the lower end of which is formed with a cylinder 168 having a delivery end or port attached to the concrete delivery conduit 142. The cylinder 168 is provided therein with an auger 170 having a shaft 172 extending back from the cylinder 168 and which is connected to a reciprocal piston in a hydraulic pump or cylinder 174. Shaft 172 is connected to a schematically illustrated one-way clutch 176 adapted to rotate the shaft and its associated auger 170 by motor means (not shown).

Figure 15:
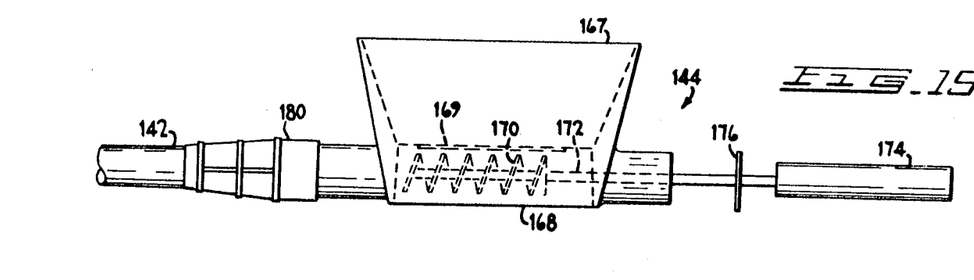
FIG. 15 appears on the same sheet as FIG. 17 and is a schematic elevation view of the concrete pump of the present invention.

In operation, zero to one inch slump concrete is dropped into the hopper 167 where it falls by gravity through a communicating opening 169 into the cylinder 168 and about the blades of the auger 170. The latter and the shaft 172 is rotated so that the auger 170 is wound backwards through the concrete in a direction away from the delivery point until such time as the forward end of the auger is at the rearmost point of the cylinder 168. At this point, clutch 176 is disengaged from its motor means and hydraulic cylinder 174 is actuated by a limit switch or the like, thereby thrusting the shaft 172 forwardly whereby the head of the auger forces the concrete in the cylinder 168 outwardly through the delivery port and into the conduit 142. This operation is repeated so that the concrete again falls by gravity around the blades of the auger 170 and it is subsequently wound backwards therethrough and again reciprocated forwardly. It has been found that a delivery pressure approaching 2000 lbs./sq. in. is thus provided to the concrete in the conduit 142 and which is delivered about the form sleeve 122 where it is engaged by the vibrators 146 on the radial flange 138 of the collar 126. This pressure is sufficient, when combined with the hydraulic jacks 134, to propel the tunnel digging machine 1 along its prescribed path of excavation.

Figure 16:
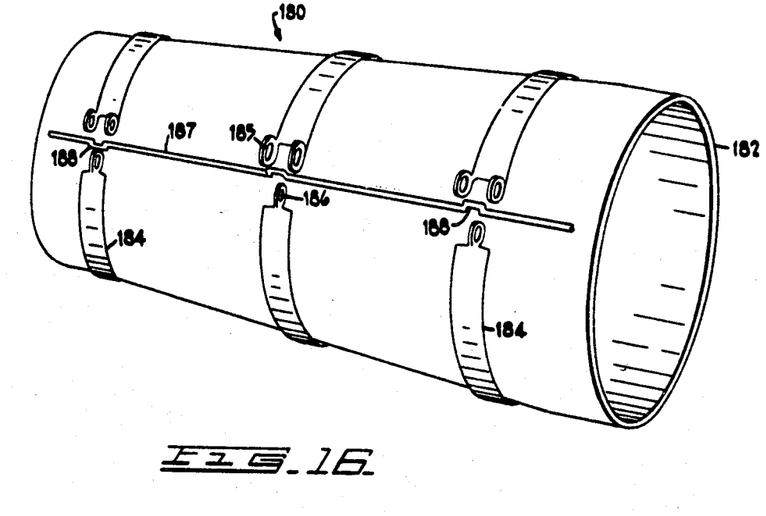
FIG. 16 is a partially exploded sectional view of the mechanical throat for the concrete pump shown in FIG. 15.

If extremely dry concrete is being used, assistance to the delivery thereof in the conduit 142 is provided by a vibratory mechanical throat 180 (FIG. 15) that may be inserted between the forward end of the hopper cylinder 168 and the adjacent end of the conduit 142. The throat 180 is shown in greater detail in FIG. 16 and it comprises a resilient tube 182 frusto-conical configuration which is provided with a plurality of split annular bands 184 mounted on the outer periphery of the tube 180 and spaced along the length thereof. As shown in the exploded view of FIG. 16, the ends of the bands 184 have apertures or collars 185 and 186 eccentrically disposed by a cranked shaft 187 which is connected to suitable drive means (not shown). The aligned portion of the shaft 187 passes through apertures 185 whilst the cranks 188 rest in apertures 186.

Figure 17:
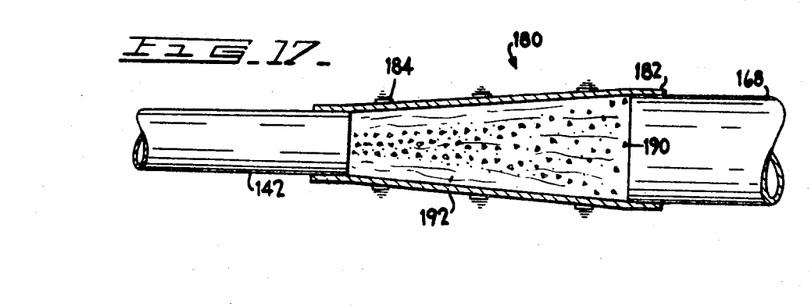
FIG. 17 is a sectional view of the apparatus shown in FIG. 16 and illustrates its preferred mode of operation.

Now as the dry concrete is pumped from the cylinder 168 into the resilient sleeve 182, the shaft 187 is rotated at extremely high revolutions, for example 2000 r.p.m., and by means of the cranks 188 acting on the apertures 185 and 186 in the bands 184 the rotation of shaft 187 provides a sequential squeezing and releasing action to each of the bands 184 which in turn imparts a "swallowing" action on the concrete within the sleeve. As shown in FIG. 17, this causes the aggregate 190 of the concrete to be directed towards the center line of the conduit 142 whilst moisture and cement 192 tend to float to the outer wall of the conduit 142 thereby providing a lubricating effect to the delivery of the concrete in the conduit.

The tunnel boring machine described herein has been successively tested and the results have indicated that the cutting head 2 progresses at the rate of approximately 10 feet per hour wherein the radial arm 60 and its associated idle sprocket 56 complete a full 360° revolution about the drive sprocket 54 approximately once every two minutes. However, it will be understood that this speed may be increased or decreased to suit various soil conditions.

It will also be appreciated that for tunnel work in extremely hard soils, for example hard pan clay, the concrete forming assembly need not necessarily be used in which case a shallow shield similar to sleeve 122 would be utilized together with the walking beams 16 to provide the required propelling movement of the boring machine. In laying a concrete lined tunnel, the walking beam would be utilized until such time as the concrete lining or conduit is encountered by the rearmost part of the boring machine 1 at which point the propelling movement of the machine can be solely provided by the pressure of the concrete pumped to the forming assembly.

I claim:

1. A tunnel boring machine comprising a frame; a work head operatively mounted on said frame adjacent one end thereof being adapted to excavate a tunnel face; a conveyor on said frame for transferring cuttings from the work head and tunnel face to the rear portion of the machine; said frame including:
    (a) A base portion;
    (b) A column secured to said base portion, said work head being swingably and slidably mounted on said column;
    (c) First hydraulic means for raising and lowering the work head on the column; and
    (d) Second hydraulic means pivotally connected at one end of the frame and at its other end to the work head for securing the latter on said column and to said tunnel face;
        said work head including:
            (1) Cutting means defining the radius of said tunnel;
            (2) First drive means adapted to actuate said cutting means;
            (3) A universal joint connecting said cutting means and said first drive means; and
            (4) Second drive means adapted to rotate the cutting means and the universal joint so as to form the periphery of said tunnel;
means for providing angular movement of said work head with respect to the longitudinal axis of said machine; means for providing angular movement to the universal joint with respect to the work head as well as the first and second drive means whereby the cutting means may undercut obstructions in the face of the tunnel; and a walking beam arrangement for moving said machine along a defined path of excavation.

2. A tunnel boring machine according to claim 1 wherein said cutting means comprises: a mainshaft driven by said first drive means and extending beyond said universal joint; a drive sprocket mounted on said mainshaft; an arm secured to and extending radially from said universal joint; an idler sprocket mounted for rotation on said arm; a roller chain mounted for circulation on said sprockets; a plurality of cutting members on said chain; and means interconnecting said work head and said universal joint for providing angular movement of the latter with respect to said mainshaft and said work head.

3. A tunnel boring machine according to claim 1 wherein said walking beam arrangement comprises a gripping assembly including a beam hingeably connected to said frame and having a wall engaging surface; a plurality of gripping members on said wall engaging surface, and a jacking member connected at one end to said frame and at its other end to said assembly whereby the latter may be brought into or out of engagement with the tunnel wall; and an hydraulically operated cylinder interconnecting said gripping assembly and the frame adapted, when actuated, to move said frame and machine along the path of excavation relative to said gripping assembly.

4. A tunnel boring and lining machine comprising
    (a) a frame;
    (b) a work head operatively mounted on said frame adjacent one end thereof adapted to excavate a tunnel face;
    (c) a conveyor on the frame for transferring cuttings from the work head and tunnel face to the rear portion of the machine; and
    (d) a lining assembly mounted on said frame adapted to form a conduit in said tunnel from concrete poured in situ during said excavation including means for progressively moving said machine along a define path of excavation; means for providing angular movement of said work head with respect to the longitudinal axis of said machine; means for providing angular movement to the universal joint with respect to the work head as well as the first and second drive means whereby the cutting means may under cut obstructions in the face of the tunnel; said frame including (i) a base portion; (ii) a column secured to said base portion, said work head being swingably and slidably mounted on said column; (iii) first hydraulic means for raising and lowering the work head on the column; and (iv) second hydraulic means pivotally connected at one end of the frame and at its other end to the work head for securing the latter on said column and to said tunnel face; said work head including (i) cutting means defining the radius of said tunnel; (ii) first drive means adapted to actuate said cutting means; (iii) a universal joint connecting said cutting means and said first drive means; and (iv) second drive means adapted to rotate the cutting means and the universal joint so as to form the periphery of said tunnel; said lining assembly including (i) a sleeve mounted on said frame and enclosing said work head; (ii) a first annular collar detachably secured to said sleeve adjacent the forward end thereof; (iii) a second annular collar slidably mounted on said sleeve adjacent said first collar; said first collar having a radial surface normal to said sleeve and a tunnel wall engaging flange portion concentric with said sleeve; said second collar having a radial surface normal to said sleeve and a flange portion concentric therewith and being slidable within the wall engaging portion of said first collar; (iv) the outer periphery of said sleeve constituting an inner form for said tunnel conduit and the tunnel wall constituting the outer form; and the cutting means of said work head extending outwardly from said lining assembly.

5. A tunnel boring machine according to claim 4 wherein said sleeve is provided with at least one aperture for delivery of concrete between said tunnel wall and said sleeve so as to form said conduit; a plurality of vibrators operatively mounted on said second collar so as to act on said concrete between said sleeve and said tunnel wall; and the means for progressively moving the machine comprising a plurality of jacking members between the radial surfaces of said first and second collars adapted when actuated, to draw said first collar and said sleeve along the tunnel relative to said second collar and said conduit thereby to progressively move said machine.

6. A tunnel boring machine according to claim 5 wherein said second collar is movable forwardly on said sleeve by pressure of said concrete delivered through said sleeve between the radial surface of said second collar and the tunnel conduit.

References Cited

UNITED STATES PATENTS

| | | | |
|---|---|---|---|
| 747,868 | 12/1903 | Drake | 299—56 |
| 1,338,237 | 4/1920 | Mack | 61—84 |
| 1,351,137 | 8/1920 | Sheen | 61—84 |
| 1,644,943 | 10/1927 | Osgood | 299—58 X |
| 1,685,403 | 9/1928 | Holmes | 299—72 X |
| 2,061,943 | 11/1936 | Jorgensen | 259—1 |
| 2,067,583 | 1/1937 | Stark | 198—64 |
| 2,075,093 | 3/1937 | Cannon | 259—1 |
| 2,229,086 | 1/1941 | Joy | 299—72 X |
| 2,322,146 | 6/1943 | Kuhn | 299—72 X |
| 2,572,403 | 10/1951 | Stevenson | 299—82 X |
| 2,829,600 | 4/1958 | Sveda | 103—45 |
| 2,837,325 | 6/1958 | Biedess | 299—31 |
| 2,858,011 | 10/1958 | Wahl | 198—64 |
| 2,988,348 | 6/1961 | Robbins | 299—31 |
| 3,061,288 | 10/1962 | Robbins | 299—31 |

ERNEST R. PURSER, *Primary Examiner.*

JACOB SHAPIRO, *Examiner.*